April 11, 1961

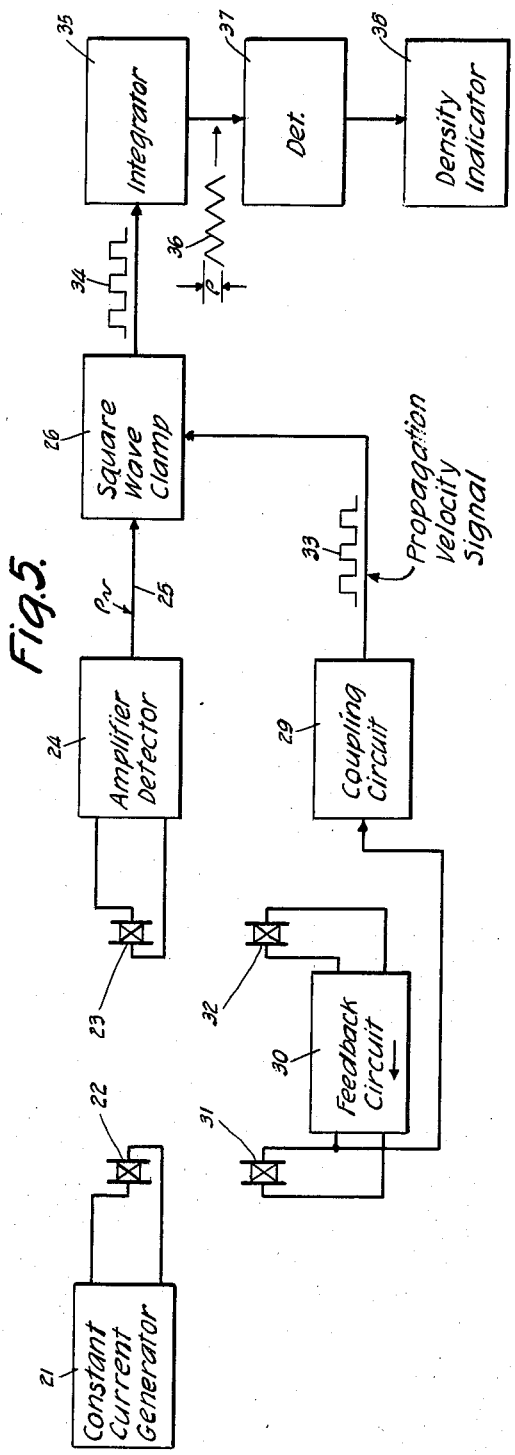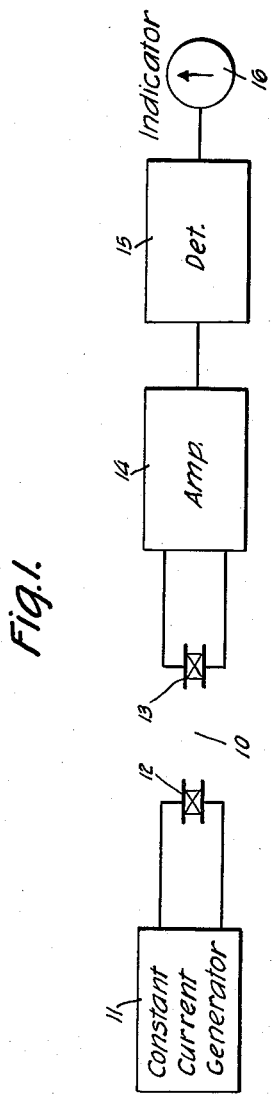

J. KRITZ 2,978,899

ULTRASONIC SYSTEM FOR MEASURING THE PHYSICAL
CHARACTERISTICS OF A GAS

Filed Feb. 10, 1956

INVENTOR.
Jack Kritz

BY

Moses, Nolte, Crews & Berry
ATTORNEYS

United States Patent Office 2,978,899
Patented Apr. 11, 1961

2,978,899
ULTRASONIC SYSTEM FOR MEASURING THE PHYSICAL CHARACTERISTICS OF A GAS

Jack Kritz, 60—02C 192nd St., Flushing, N.Y.

Filed Feb. 10, 1956, Ser. No. 564,751

15 Claims. (Cl. 73—24)

The present invention relates to an ultrasonic system for the measurement of certain characteristics of gases, such as the density and the pressure. The system may, accordingly, be used as a densitometer or as a vacuum gauge.

Densitometers have been previously disclosed employing techniques whereby the acoustic impedance of a fluid is represented as a resistive element in the equivalent electrical circuit of a crystal in contact with the fluid and thereby measured. A difficulty encountered in the measurement of the acoustic impedance of a gas is that the magnitude of this resistance is extremely small and may be of the same order of magnitude, or smaller, than the resistive component representing the inherent losses of the transducing crystal itself.

It is one object of the present invention to overcome the above-mentioned difficulties and thereby provide a densitometer capable of measuring the density of a gas.

Still another object of the invention is to provide an ultrasonic device for measuring the pressure of a gas even at low pressures, whereby said device may serve as a vacuum gauge.

It is a further object of the invention to obtain the above-mentioned results with a system of maximum simplicity.

Further objects and advantages of this invention will become apparent from the following detailed description thereof and from the accompanying drawings in which:

Fig. 1 is a schematic diagram of one embodiment of the invention;

Fig. 5 is a block diagram of a densitometer according to the invention.

Figure 3:
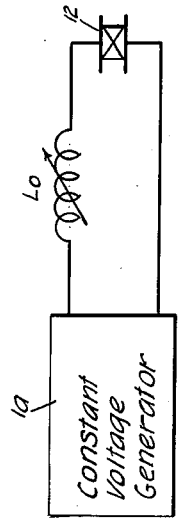
Fig. 3 is a diagram of a modification of the transmitter portion of Fig. 1.

Referring to the drawings, Fig. 1 shows a constant current generator 11 for delivering a constant current at the resonant carrier frequency of a transducer 12. The transducers 12 and 13 are electromechanical transducers for the transmission and reception of compressional vibrations in gaseous medium 10 between transducers 12 and 13. Transducers 12 and 13 may, in particular, be piezoelectric crystals of the X-cut type. The transducers are located and oriented so that one will efficiently transmit and the other will efficiently receive the pressure waves propagated through the gas. Since such electroacoustic transducers are well known in the art, they will not be described and illustrated in detail but it will be understood that they may include any suitable means for increasing the efficiency of their transmission and reception. Receiving transducer 13 is connected to amplifier 14 which may, in turn, be connected to detector 15 so that the oscillations produced by the acoustic vibrations received by transducer 13 may be displayed on a suitable utilization device or indicator 16. In some instances detector 15 may be unnecessary, or it may be combined with amplifier 14. Indicator 16 may simply be a meter or any other type of suitable indicator. The signal developed in the output of amplifier 14 or detector 15 may also be supplied to computational or control apparatus.

Figure 2:
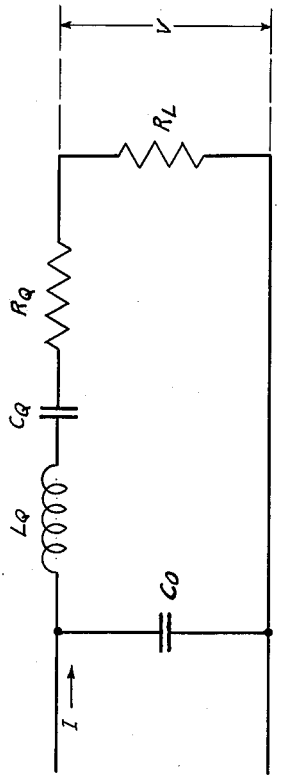
Fig. 2 is an equivalent circuit diagram of the transmitting crystal.

The mode of operation of the circuit shown in Fig. 1 may best be described in connection with the equivalent circuit diagram of the piezoelectric crystal shown in Fig. 2. The equivalent circuit of the crystal includes a capacitor $C_0$ representing the static capacitance of the crystal. The series elements $L_Q$, $C_Q$ and $R_Q$ represent the inductance, capacitance and resistance determined by the crystal parameters. The resistance $R_L$ is the transformed acoustic impedance of the gas and is given by the equations $R_L = K\rho v$ where K is a constant determined by the crystal parameters and $\rho v$ is the specific acoustic impedance of the gas to be measured and is the product of its density and the velocity of ultrasonic propagation in the gas. With a constant current I delivered to transducer 12, the voltage developed across equivalent resistor $R_L$ is given by $V = KI\rho v$. This voltage corresponds to the acoustic pressure developed in the gas. The amplitude of the acoustic wave impinging on receiving transducer 13, is then proportional to the acoustic impedance of the gas, namely $\rho v$. Transducer 13, therefore, produces an electrical signal having an amplitude related to the amplitude of the acoustic wave. The electrical signal is amplified by amplifier 14, giving an output voltage proportional to the acoustic impedance. Indicator 16 therefore will produce an indication proportional to the density of the gas. Variations of the density of the gas will be indicated by variations of the reading of indicator 16.

Fig. 3 shows a transmitter in which an effective constant current generator is obtained by connecting a constant voltage generator 19 through an inductance $L_0$ to transmitting transducer 12. The generator 19 may be an amplitude stabilized constant frequency oscillator of any suitable type. Inductance $L_0$ is adjusted so that it is series resonant with capacitance $C_0$ of the crystal transducer at the operating frequency. Under these conditions of adjustment, constant voltage generator 19 and inductance $L_0$, in effect, constitute a constant current generator.

Figure 4:
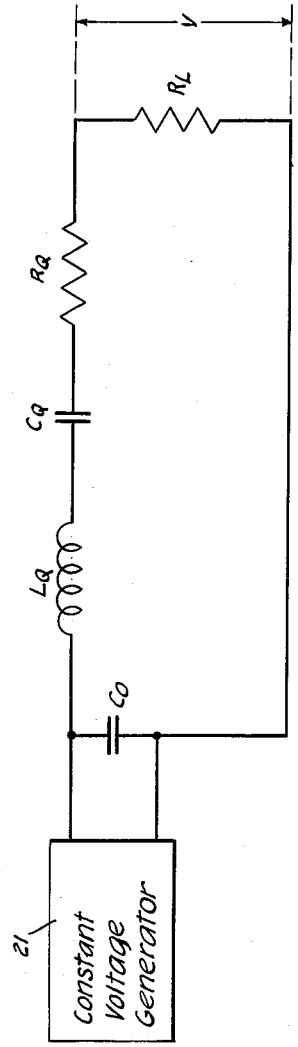
Fig. 4 is a circuit diagram of still another modification of the transmitting portion of Fig. 1.

Another embodiment of the transmitter represented in Fig. 1 by the constant current generator 11 and transducer 12 is shown in Fig. 4. In this figure, as in Fig. 2, the quartz crystal is represented by its equivalent circuit. A constant voltage source or generator 20 impresses oscillations of a constant amplitude on the quartz crystal. The frequency of these oscillations is substantially equal to the parallel resonant frequency of the quartz crystal. This frequency is such that the series combination of inductance $L_Q$ and capacitance $C_Q$ has a net inductive reactance equal to the capacitive reactance of capacitance $C_0$. This arrangement effectively places a large inductance in series with resistance $R_L$. The abovementioned frequency relationship may be stated as follows. The frequency of constant voltage generator 20 is $\omega$ where $\omega$ is defined by the equation $$\omega L_Q - \frac{1}{\omega C_Q} = \frac{1}{\omega C_0}$$

The arrangement in Fig. 4 has the advantage that the input impedance of the transmitting transducer is high and, therefore, can more easily be driven from a constant voltage source. Also, the transducer may be used as the frequency controlling element of a conventional crystal controlled vacuum tube oscillator operating at the resonant frequency of the crystal.

It will now be shown that the simple device illustrated in Fig. 1 and described above, constitutes a vacuum gauge as well as a densitometer under certain operating conditions.

In the application of the device as a vacuum gauge, the output meter reading of $\rho v$ is sufficient to indicate the pressure and can be used directly. At low gas pressures where the mean free path of the gas molecules is of the order of the wavelength, the velocity of sound is given by Newton's equation:

$$v=\sqrt{\frac{p}{\rho}}$$

where $p$ is the gas pressure and $\rho$ is the gas density.

The acoustic impedance is then expressed by the equation:

$$\rho v=\sqrt{\frac{\rho^2 p}{\rho}}=\sqrt{\rho p}$$

but $$\rho=\frac{pm}{kT}$$

where:
$m$ = mass of the gas molecule
$k$ = Boltzman gas constant
$T$ = absolute temperature
$\rho v$ is then given by $$\rho v=\sqrt{\frac{p^2 m}{kT}}=p\sqrt{\frac{m}{kT}}$$

and is proportional to the gas pressure.

$\rho v$ can also be expressed as $$\rho\sqrt{\frac{kT}{m}}$$

Hence, the indicator 16 can be calibrated to give a direct reading of the pressure or the density of a low pressure gas.

Fig. 5 shows a device for measuring the density of a gas at higher pressures, for examples, pressures in the neighborhood of atmospheric pressure or above atmospheric pressure. The transmitter consisting of a constant current generator 21 and a transducer 22 may be of any of the forms illustrated in Figs. 1, 3 and 4. Transducer 22 preferably includes a piezoelectric crystal located so as to direct acoustic vibrations toward receiving transducer 23. The vibrations impinging on transducer 23 produce electrical oscillations which are fed to the input of an amplifier and detector circuit 24. The output of amplifier-detector circuit 24 is fed to a square wave clamping circuit 26. Clamping circuit 26 is also connected to a device for measuring the propagation velocity of the acoustic waves in the gas. This device comprises a transmitting transducer 31 and a receiving transducer 32 which may be similar to transducers 22 and 23 and in acoustic contact with the same gas as the transducers 22 and 23. Transducers 31 and 32 are interconnected by a feedback circuit 30. The feedback circuit may, in its simplest form, be an amplifier, or it may be any other known type of feedback circuit for producing output oscillations in response to received oscillations. The vibrations transmitted by transducer 31 are received by transducer 32. The latter produces electrical oscillations which are supplied by feedback circuit 30 to transmitting transducer 31. The rate at which oscillations traverse the loop 30, 31 and 32 depends on the propagation velocity of the acoustic waves through the gas. The oscillations in loop 30, 31 and 32 are fed to clamp circuit 26 through a suitable coupling circuit 29, the output of which is a rectangular wave 33, the frequency of which corresponds to the propagation velocity of the acoustic waves through the gas. A clamp circuit 26 clamps the amplitude of wave 33 to a value corresponding to the output of the detector-amplifier 24. The output of clamp circuit 26, therefore, is a wave 34 which is impressed on an integrator circuit 35. The output of integrator circuit 35 is a wave 36 of triangular form having a peak amplitude proportional to the density of the gas. The wave 36 is detected by detector 37, which is preferably a peak detector, the output of which may be fed to any desired utilization circuit or to a density indicator or meter 38.

The operation of the circuit of Fig. 5 may be described briefly as follows. Transducer 22 transmits acoustic vibrations having an amplitude proportional to the acoustic impedance of the gas. These vibrations are directed toward and are received by transducer 23, which responds by producing electrical oscillations of a corresponding amplitude. These oscillations are amplified and detected to produce an output voltage at output connection 25 of amplifier-detector 24, which has an amplitude proportional to the acoustic impedance of the gas. The output voltage is used in clamped circuit 26 to clamp the amplitude of a wave 33 supplied thereto from the propagation velocity measuring circuit 29—32. The output of the velocity measuring circuit is a rectangular wave 33 having a frequency proportional to the acoustic propagation velocity. The rectangular wave is clamped by clamp circuit 26 to an amplitude proportional to the acoustic impedance, so that the output of clamp circuit 26 is a wave 34 having a frequency proportional to the acoustic velocity and an amplitude proportional to the acoustic impedance. The function of integrator 35, then, is to divide the electrical quantity proportional to the acoustic impedance, namely, the amplitude of wave 34, by an electrical quantity proportional to the propagation velocity, namely, the frequency of wave 34, in order to produce an output wave 36 having an amplitude proportional to the density. The wave 36 is then detected and used to indicate the density of the gas.

I have described several preferred embodiments of my invention, but it is to be understood that the description is illustrative only. The scope of the invention is indicated by the claims which follow.

I claim:

1. A system for measuring a physical characteristic of a gas comprising means for producing pressure waves in said gas having an amplitude proportional to the acoustic impedance thereof, said means including a first transducer in acoustic contact with the gas and means for energizing said transducer with constant current oscillations having a frequency equal to a resonant frequency of the transducer, a second transducer for receiving the pressure waves transmitted through the gas from the first transducer and producing electrical oscillations proportional to the amplitude of said waves, and means connected to said second transducer for measuring the amplitude of the oscillations produced by the second transducer.

2. A system according to claim 1, wherein the measuring means includes an amplifier connected to said second transducer and means connected to the output of said amplifier for indicating the density of the gas.

3. A system according to claim 1, wherein said gas is at a low pressure relative to atmospheric pressure and the measuring means includes an amplifier connected to said second transducer and means connected to the output of said amplifier for indicating the pressure of the gas.

4. A system according to claim 1, wherein each transducer includes a piezoelectric crystal.

5. A system according to claim 1, wherein said transducers include X-cut piezoelectric crystals.

6. A system according to claim 4, wherein said means for energizing the crystal of the transmitting transducer is a constant voltage generator connected to said transmitting crystal through an inductance having a reactance substantially numerically equal to the reactance of the static capacitance of said transmitting crystal at the operating frequency.

7. A system for measuring the density of a gas comprising means for producing pressure waves in said gas having an amplitude proportional to the acoustic impedance thereof, said means including a first transducer in acoustic contact with the gas and means for energizing said transducer with constant current oscillations having a frequency equal to a resonant frequency of the transducer, a second transducer means for receiving the pressure waves transmitted through the gas from the first transducer and for producing electrical oscillations proportional to the amplitude of said waves, means for measuring the propagation velocity in said gas of pressure waves of said frequency and deriving a first electrical quantity proportional to said propagation velocity, means connected to said second transducing means for producing a second electrical quantity proportional to the amplitude of the received pressure waves, means connected to the last two mentioned means for dividing the second electrical quantity by the first electrical quantity to produce a third electrical quantity proportional to the density of the gas, and means for utilizing the third electrical quantity.

8. A system for measuring a physical characteristic of a gas comprising means for producing pressure waves in said gas having an amplitude proportional to the acoustic impedance thereof, said means including a first transducer in acoustic contact with the gas, said transducer being parallel resonant at a given frequency, and a constant voltage generator of electrical oscillation connected to said transducer, said generator having a frequency equal to the frequency at which said transducer is parallel resonant, a second transducer for receiving the pressure waves transmitted through the gas from the first transducer, means connected to said second transducer for producing electrical oscillations having an amplitude proportional to the amplitude of said pressure waves and means responsive to the amplitude of said last mentioned electrical oscillations.

9. A system according to claim 8, wherein said transducers include X-cut piezoelectric crystals.

10. A system according to claim 9, wherein said generator is an oscillator of which the piezoelectric crystal of the transmitting transducer constitutes the frequency determining element.

11. A system for measuring the density of a gas comprising means for producing pressure waves in the gas having an amplitude proportional to the acoustic impedance of the gas, said means including a first piezoelectric crystal transducer in acoustic contact with the gas and means for energizing said transducer with high frequency electrical oscillations having a frequency equal to a resonant frequency of the transducer, and means for receiving said pressure waves and measuring the amplitude of said pressure waves, said last mentioned means including a second piezoelectric crystal transducer juxtaposed to the first transducer and in acoustic contact with said gas so that the pressure waves travel directly and only through said gas from said first transducer to said second transducer.

12. A system comprising means for producing ultrasonic vibrations in a gas having an amplitude proportional to the acoustic impedance of the gas, said means including a first piezoelectric crystal transducer in acoustic contact with the gas and means for energizing said transducer with oscillations having a frequency equal to a resonant frequency of the transducer, means for receiving said ultrasonic vibrations, and means responsive to the amplitude of the received vibrations for measuring the pressure of the gas, said last means including a second piezoelectric crystal transducer in acoustic contact with said gas and juxtaposed to said first mentioned transducer so that the ultrasonic vibrations travel from the first transducer to the second transducer only through said gas.

13. A densitometer comprising means for generating a current wave of constant amplitude and constant frequency, a first piezoelectric crystal transducer connected to said generator, said transducer being disposed in the gas of which the density is to be measured, a receiving piezoelectric crystal transducer disposed in said gas and located and directed so as to receive the acoustic waves transmitted by said first transducer, means connected to said receiving transducer for deriving a potential therefrom, propagation velocity determining means including a feedback loop and spaced transmitting and receiving transducing means interconnected by said loop for propagating and receiving acoustic waves which travel through said gas, said velocity determining means producing a first electrical wave of rectangular wave form having a period substantially inversely proportional to the propagation velocity of the acoustic waves in the gas, clamping means for combining said rectangular wave and said potential for producing a second rectangular wave having a duration determined by the period of said first rectangular wave and an amplitude determined by the magnitude of said potential, integrating means coupled to said clamping means for deriving from said second rectangular wave a wave of triangular wave form having a peak amplitude proportional to the density of the gas, a detector connected to said integrating means for deriving from said triangular wave a voltage proportional to the density of the gas.

14. Apparatus for measuring the pressure of a gas at pressures which are low compared to atmospheric pressure, comprising means including an electroacoustic transducer in acoustic contact with the gas to be measured for producing ultrasonic vibrations in the gas having a wave length of the same order of magnitude as the mean free path of the gas molecules and having an amplitude proportional to the acoustic impedance of the gas, means including a second electroacoustic transducer in acoustic contact with the gas to be measured for receiving said ultrasonic vibrations, and measuring means responsive to the amplitude of the received vibration for measuring the pressure of the gas.

15. Apparatus according to claim 14, wherein the receiving means includes a piezo-electric crystal mounted in said gas in the path of said ultrasonic vibrations, and an amplifier having its input connected to said crystal; and said measuring means includes means connected to said amplifier for measuring the magnitude of the output of said amplifier and indicating the pressure of said gas.

References Cited in the file of this patent

UNITED STATES PATENTS

| | | |
|---|---|---|
| 2,527,208 | Berry et al. | Oct. 24, 1950 |
| 2,745,278 | Roberts | May 15, 1956 |

OTHER REFERENCES

Publication: "Ultrasonic Gas Analyzer," by Kniazuk et al., Instruments and Automation, vol. 28, pp. 1916, 1917 (November 1955).

Articles:

(1) "Absorption of Ultrasonic Waves by Various Gases," by T. Abello in Physical Review, vol. 31, June 1928, pages 1083–1091.

(2) "Pierce Acoustic Interferometer etc.," by H. Pielemerer in Physical Review, vol. 34, October 15, 1929, pages 1184–1203.